US012761969B2

(12) United States Patent
Mu et al.

(10) Patent No.: US 12,761,969 B2
(45) Date of Patent: Oct. 13, 2026

(54) METHOD, APPARATUS, DEVICE AND MEDIUM FOR PERFORMING TASK IN COMPUTING SYSTEM

(71) Applicant: Douyin Vision Co., Ltd., Beijing (CN)

(72) Inventors: Zhenliang Mu, Beijing (CN); Shaochen Shi, Beijing (CN); Zhengju Sha, Beijing (CN); Lifei Chen, Beijing (CN); Chi Xu, Beijing (CN); Di Wu, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 316 days.

(21) Appl. No.: 18/516,009

(22) Filed: Nov. 21, 2023

(65) Prior Publication Data

US 2024/0184635 A1 Jun. 6, 2024

(30) Foreign Application Priority Data

Nov. 28, 2022 (CN) ........................ 202211503413.2

(51) Int. Cl.
*G06F 9/46* (2006.01)
*G06F 9/48* (2006.01)
*G06F 9/50* (2006.01)

(52) U.S. Cl.
CPC ............ *G06F 9/505* (2013.01); *G06F 9/4881* (2013.01); *G06F 9/5072* (2013.01)

(58) Field of Classification Search
CPC ....... G06F 9/505; G06F 9/4881; G06F 9/5072
See application file for complete search history.

(56) References Cited

U.S. PATENT DOCUMENTS

| | | | |
|---|---|---|---|
| 8,719,415 | B1 | 5/2014 | Sirota et al. |
| 2020/0278889 | A1 | 9/2020 | Cai et al. |

FOREIGN PATENT DOCUMENTS

| | | | |
|---|---|---|---|
| CN | 104615487 | A | 5/2015 |
| CN | 104765648 | A | 7/2015 |
| CN | 104915407 | A | 9/2015 |
| CN | 104320484 | B | 7/2017 |
| CN | 111324435 | A | 6/2020 |
| CN | 114363328 | A | 4/2022 |

OTHER PUBLICATIONS

China National Intellectual Property Administration, Office Action and Search Report Issued in Application No. 202211503413.2, Aug. 10, 2026, 13 pages.

*Primary Examiner* — Gregory A Kessler
(74) *Attorney, Agent, or Firm* — Alleman Hall LLP

(57) ABSTRACT

A method, apparatus, device and medium for executing tasks in a computing system are provided in the present disclosure. The computing system comprises a first computing node and a plurality of second computing nodes, available duration of the first computing node is known, and the available duration of the plurality of second computing nodes is unknown. A task manager is started at the first computing node, the task manager being used to manage a plurality of tasks to be executed in the computing system. The task manager requests a set of second computing nodes in the plurality of second computing nodes to the computing system. The task manager distributes a target task in the plurality of tasks to the set of second computing nodes so as to execute the target task by using the set of second computing nodes.

20 Claims, 5 Drawing Sheets

METHOD, APPARATUS, DEVICE AND MEDIUM FOR PERFORMING TASK IN COMPUTING SYSTEM

CROSS-REFERENCE TO RELATED APPLICATIONS

The present application claims priority to Chinese Patent Application No. 202211503413.2 filed on Nov. 28, 2022, and entitled "METHOD, APPARATUS, DEVICE AND MEDIUM FOR EXECUTING TASK IN COMPUTING SYSTEM", the entirety of which is incorporated herein by reference.

FIELD

Example implementations of the present disclosure generally relate to task scheduling, and in particular, to a methods apparatus, device and computer-readable storage media for executing tasks at a plurality of computing nodes in a computing system.

BACKGROUND

With the development of distributed processing technology, computing systems can include a large number of computing nodes. The available duration of different computing nodes can vary. For example, some computing nodes can be available for a long time (such as days, weeks, or even longer); however, some computing nodes might only be available for a short period of time (such as minutes, hours, etc.), and even might be recycled by the computing system at any time in the future. When the computing nodes are recycled, the tasks executed at the computing nodes will be interrupted. Therefore, users of the computing system tend to use computing nodes with longer available duration. At this time, a large number of computing nodes with shorter available duration in the computing system might be left idle, resulting in waste of computing resources. Thereby, how to use various computing nodes in the computing system in a more effective way to execute tasks has become a research hotspot and difficulty in the field of task scheduling.

SUMMARY

In a first aspect of the present disclosure, a method of executing tasks in a computing system is provided. The computing system comprises a first computing node and a plurality of second computing nodes, the available duration of the first computing node is known, and the available duration of the plurality of second computing nodes is unknown. In the method, a task manager is started at the first computing node, the task manager being used to manage a plurality of tasks to be executed in the computing system. The task manager requests a set of second computing nodes in the plurality of second computing nodes to the computing system. The task manager distributes a target task in the plurality of tasks to the set of second computing nodes so as to execute the target task by using the set of second computing nodes.

In a second aspect of the present disclosure, an apparatus for executing tasks in a computing system is provided. The computing system comprises a first computing node and a plurality of second computing nodes, the available duration of the first computing node is known, and the available duration of the plurality of second computing nodes is unknown. The apparatus comprises: a start module, configured for starting a task manager at the first computing node, the task manager being used to manage a plurality of tasks to be executed in the computing system; a request module, configured for requesting, by the task manager, a set of second computing nodes in the plurality of second computing nodes to the computing system; and a distributing module, configured for distributing, by the task manager, a target task in the plurality of tasks to the set of second computing nodes so as to execute the target task by using the set of second computing nodes.

In a third aspect of the present disclosure, an electronic device is provided. The electronic device comprises: at least one processing unit; and at least one memory, coupled to the at least one processing unit and storing instructions to be executed by the at least one processing unit, the instructions, when executed by the at least one processing unit, causing the electronic device to perform a method in the first aspect.

In a fourth aspect of the present disclosure, a computer readable storage medium is provided, on which a computer program is stored, the computer program, when executed by a processor, causing the processor to perform a method in the first aspect.

It would be understood that the content described in the Summary section of the present disclosure is neither intended to identify key or essential features of implementations of the present disclosure, nor is it intended to limit the scope of the present disclosure. Other features of the present disclosure will be readily envisaged through the following description.

BRIEF DESCRIPTION OF THE DRAWINGS

Through the detailed description with reference to the accompanying drawings, the above and other features, advantages, and aspects of respective implementations of the present disclosure will become more apparent. The same or similar reference numerals represent the same or similar elements throughout the figures, wherein.

DETAILED DESCRIPTION

Figure 1:
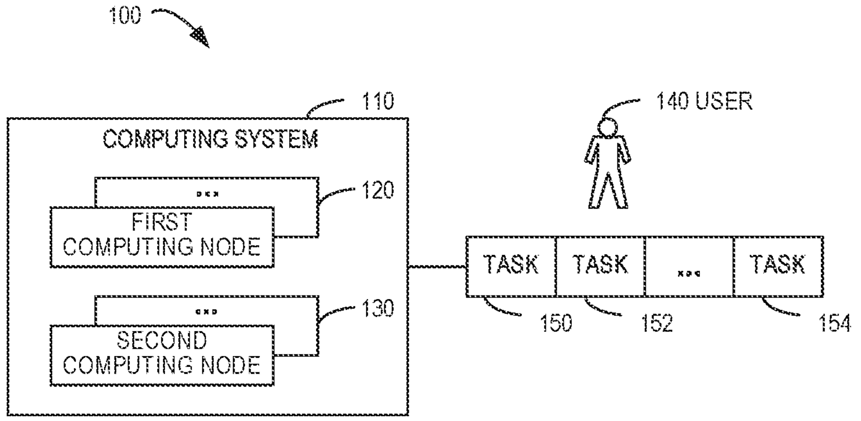
FIG. 1 shows a block diagram of an application environment in which an example implementation of the present disclosure can be applied.

Implementations of the present disclosure will be described in more detail below with reference to the accompanying drawings. Although some implementations of the present disclosure are shown in the drawings, it would be understood that the present disclosure can be implemented in various forms and should not be interpreted as limited to the implementations described herein. On the contrary, these implementations are provided for a more thorough and complete understanding of the present disclosure. It would be understood that the drawings and implementations of the present disclosure are only for the purpose of illustration and are not intended to limit the scope of protection of the present disclosure.

In the description of implementations of the present disclosure, the term "comprising", and similar terms should be understood as open inclusion, i.e., "comprising but not limited to". The term "based on" should be understood as "at least partially based on". The term "one implementation" or "the implementation" should be understood as "at least one implementation". The term "some implementations" should be understood as "at least some implementations". Other explicit and implicit definitions may also be comprised below.

It is understandable that the data involved in this technical proposal (comprising but not limited to the data itself, data obtaining, use, storage, or deletion) shall comply with the requirements of corresponding laws, regulations, and relevant provisions.

It is understandable that before using the technical solution disclosed in respective implementations of the present disclosure, users shall be informed of the type, using scope, and using scenario of personal information involved in the present disclosure in an appropriate way, and be authorized by users according to relevant laws and regulations.

For example, in response to receiving a proactive request from a user, prompt information is sent to the user to explicitly remind the user that a requested operation will require the obtaining and use of personal information of the user, so that the user may independently choose, according to the prompt information, whether to provide personal information to electronic devices, applications, servers or storage media and other software or hardware that perform operations of the technical solution of the present disclosure.

As an optional but non-limiting implementation, in response to receiving a proactive request from a user, the way of sending prompt information to the user may be, for example, a popup window, in which the prompt information may be presented in the form of text. In addition, the popup window may further carry a selection control for the user to choose "agree" or "disagree" to provide personal information to electronic devices.

It is understandable that the above process of notifying and obtaining user authorization is only for the purpose of illustration and does not imply any implementations of the present disclosure. Other ways, to satisfy the requirements of relevant laws and regulations, may also be applied to implementations of the present disclosure.

As used herein, the term "in response to" is to represent a state in which a corresponding event occurs or a condition is satisfied. It will be understood that the timing of the subsequent action performed in response to the event or a condition may not be strongly correlated with the time when the event occurs or the condition is satisfied. For example, in some cases, the subsequent action may be performed immediately when the event occurs or the condition is satisfied; in other cases, the subsequent action may be performed after a period after the event occurs or the condition is satisfied.

Example Environment

Compute-intensive tasks usually need to be processed by a large number of computing nodes (such as CPUs (central processing units) or GPUs (graphics processing units)). In particular, high-throughput tasks can include mass tasks that are independent of each other, and the duration of a single task varies, which, for example, can be as long as a day or as short as several seconds. Generally speaking, users prefer to run high-throughput tasks on stable computing nodes. During the runtime of high-throughput tasks, stable computing nodes are exclusively used by high-throughput tasks until the execution is completed.

However, computing nodes in the computing system are usually not always stable. For example, with the development of distributed computing, a resource pool including a large number of computing nodes can be provided to process tasks from different users. With reference to an application environment according to an example implementation of the present disclosure, this figure shows a block diagram 100 of an application environment in which an example implementation of the present disclosure may be applied.

As shown in FIG. 1, the computing system 100 may include one or more first computing nodes 120, which may be stable computing nodes. The available duration of such computing nodes is known, and users are allowed to continuously use such computing nodes within the available duration. Specifically, the user may pay a corresponding fee for the available duration so as to perform tasks using stable computing nodes within the scope of the available duration. Alternatively and/or additionally, the computing system 100 may include one or more second computing nodes 130, which may be elastic computing nodes. The available duration of such computing nodes is unknown. In other words, elastic computing nodes may be recycled by the computing system 110 at any time. As a result, tasks performed at elastic computing nodes are interrupted and have to be re-executed.

A user 140 can apply to use the computing nodes in the computing system 110 to perform a plurality of tasks 150, 152, . . . , and 154. Generally speaking, the user 140 prefers to use stable computing nodes to perform tasks. However, the number of stable computing nodes is limited and the cost of stable computing nodes is usually high, which increases the difficulty of the user 140 completing a large number of tasks at limited cost. Although there are a large number of elastic nodes in the computing system 110, users cannot use elastic nodes with confidence because the available duration of elastic nodes is unknown. At this time, it is desirable to use the computing power of a large number of elastic nodes in the computing system in a more secure and effective way so as to improve the performance of task execution.

Summary of Task Execution

In order to at least partially address the deficiencies in the prior art, a method for executing tasks in a computing system is proposed according to an example implementation of the present disclosure. With reference to the summary according to an example implementation of the present disclosure described in FIG. 2, this figure shows a block diagram 200 of a process for executing tasks in a computing system according to some implementations of the present disclosure. It will be understood that the term computing node (e.g., first computing node 120 and second computing node 130) here generally refers to any physical device and/or virtual device that can provide computing power, including but not limited to, centralized or distributed physical machines, virtual machines, such as containers in cloud environments.

Figure 2:
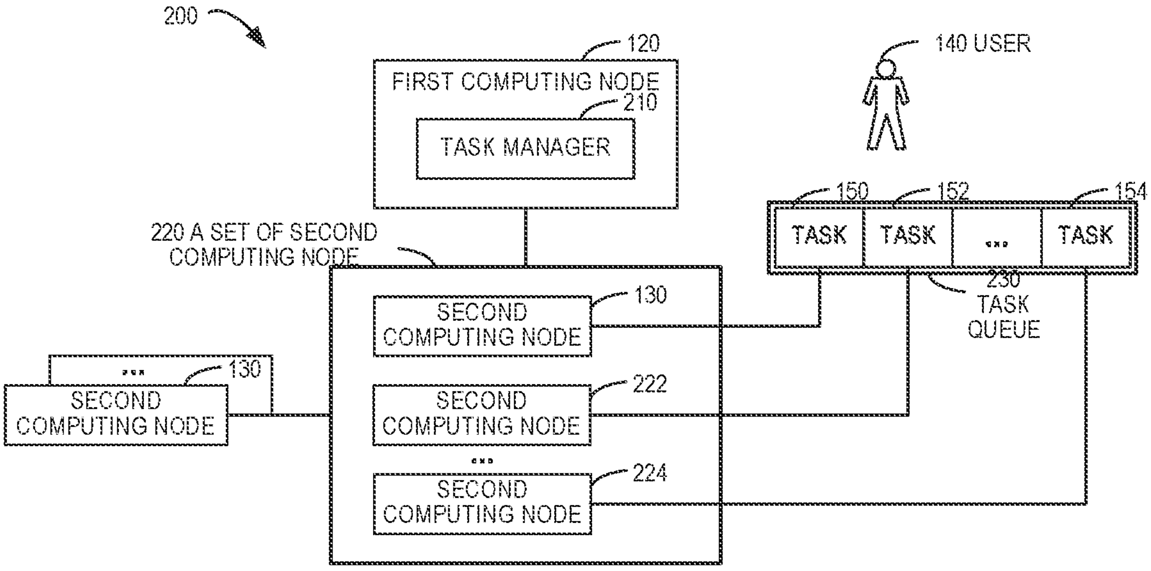
FIG. 2 shows a block diagram of a process of executing tasks in a computing system according to some implementations of the present disclosure.

As shown in FIG. 2, the available duration of the first computing node 120 in the computing system 110 is known. It will be understood that "known" here can include various situations. For example, the user can specify a predetermined available duration, such as days, weeks, months and the like according to the user's request. For another example, the user can decide when to recycle the first computing node 120, in other words, the first computing node 120 can run until the user's recycling operation is received, etc. The available duration of each second computing node 130 is unknown, in other words, the user does not know when the second computing node 130 will be recycled. Here, the plurality of second computing nodes can have the same or different available duration.

A task manager 210, which may be used to manage a plurality of tasks 150, 152, . . . , and 154 to be executed in the computing system 110, may be initiated at the stable first computing node 120. For the sake of management, a plurality of tasks to be executed may be placed in a task queue 230, the contents of which may be updated as new tasks are received and existing tasks are completed.

It will be appreciated that since the first computing node 120 is stable and the available duration is known, the task manager 210 can operate in a stable and reliable environment within the available duration, thereby ensuring that the execution of a plurality of tasks is managed in a stable and reliable manner. Further, the task manager 210 can be used to request a set of second computing nodes 220 (e.g., including second computing nodes 130, 222, . . . , and 224) in a plurality of second computing nodes from the computing system. Further, the task manager 210 can be used to distribute a target task in a plurality of tasks to the set of second computing nodes 220, so that the target task can be executed using the set of second computing nodes 220.

With the example implementation of the present disclosure, the task manager 210 running at the stable computing node can be used to call the computing power of a plurality of elastic computing nodes, thereby improving the performance of task execution.

Detailed Information on Task Execution

Figure 3:
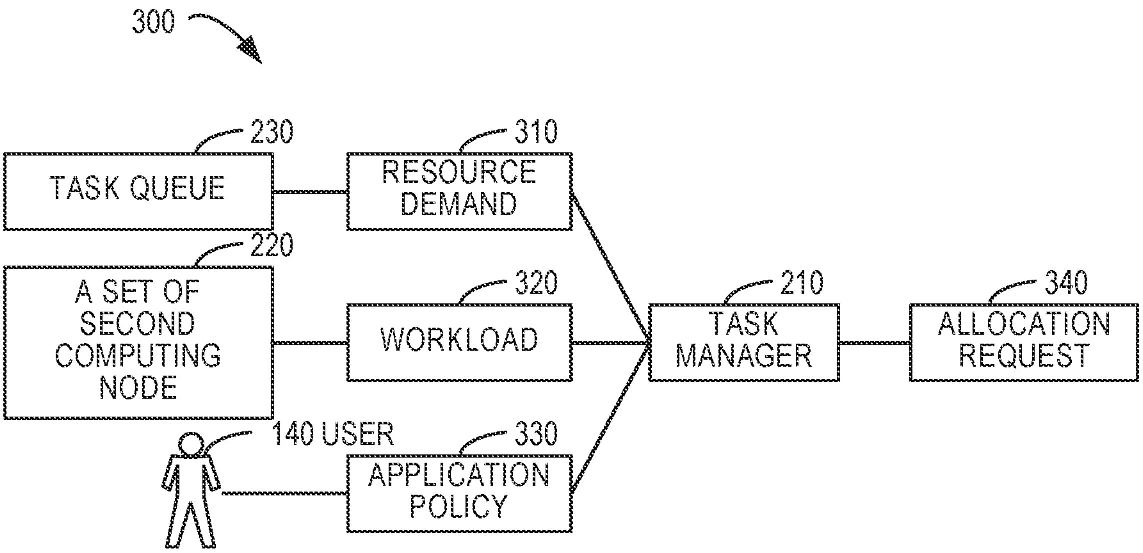
FIG. 3 shows a block diagram of a process of determining an allocation request according to some implementations of the present disclosure.

The summary has been described with reference to FIG. 2 according to an example implementation of the present disclosure, more details of task execution are provided below. According to an example implementation of the present disclosure, a certain number of second computing nodes may be requested from the computing system 110 based on a variety of factors. FIG. 3 shows a block diagram 300 of a process for determining an allocation request according to some implementations of the present disclosure. According to an example implementation of the present disclosure, an allocation request 340 may be determined based on a computing resource demand 310 for executing a plurality of tasks, and a set of second computing nodes 220 is requested from the computing system 110.

Specifically, the task manager 210 may determine the number N of tasks in the task queue 230. Assuming that each of the second computing nodes may run C tasks, N/C second computing nodes may be applied for in the initial running stage, and tasks are distributed to the applied second computing nodes. As tasks are executed, the task queue 230 and a workload 230 of the set of applied second computing nodes 220 will change. At this point, the allocation request 340 may be further adjusted based on the resource demand 310 in the task queue 230 and the workload 320. For example, if it is determined that the set of second computing nodes 220 are insufficient to serve the task queue 230, extra second computing nodes may be requested to the computing system 110; if it is determined that the workload 320 of the set of second computing nodes 220 is relatively low, then the applied second computing nodes may be released to the computing system 110.

According to an example implementation of the present disclosure, assuming that the workload 320 indicates that the set of applied second computing nodes 220 can further accommodate/tasks, then the number n of second computing nodes to be applied for can be determined based on Formula 1:

$$n = \max\left(\frac{N-I}{C}, 0\right) \quad \text{Formula 1}$$

In Formula 1, n denotes the number of second computing nodes to be applied for, N denotes the number of tasks in the task queue 230, I denotes the number of tasks which can be further accommodated by the set of applied second computing nodes 220, and C denotes the number of tasks which each second computing node can execute. In this way, the specific application method can be determined based on simple mathematical operations. Furthermore, the allocation of computing nodes can be dynamically adjusted based on the task status and the status of allocated computing nodes.

According to an example implementation of the present disclosure, the upper limit m of the number of second nodes allowed to be requested in a single request can be further considered. At this time, Formula 1 can be adjusted to Formula 2:

$$n = \min\left(\max\left(\frac{N-I}{C}, 0\right), m\right) \quad \text{Formula 2}$$

In Formula 2, m denotes the upper limit of the number of second nodes allowed in a single request, and the meanings of other symbols are the same as described above, which is not repeated. With the example implementation of the present disclosure, the number for a single application can meet the allocation regulation of the computing system 110, thereby avoiding the situation that allocatable computing nodes in the computing system 110 are insufficient.

According to an example implementation of the present disclosure, the task manager 210 may further consider the workload of the computing system 110 when requesting allocation of a second computing node to the computing system 110. For example, the number of second computing nodes to be allocated by the computing system 110 may be considered. If the number is lower than a predetermined threshold, the task manager requests a set of second computing nodes from the computing system. If the number is higher than or equal to the predetermined threshold, excessive allocation requests will further increase the workload of the computing system 110, thereby causing performance degradation or even crashes of the computing system 110. At this time, the task manager 210 may suspend the request, thereby relieving the burden on the computing system 110. The task manager 210 may periodically obtain the status of queued requests and submit the allocation requests 340 at an appropriate time.

According to an example implementation of the present disclosure, an application policy 330 of the user 140 may be further considered when requesting the allocation of a second compute node. The application policy 330 may include various contents, such as specifying a threshold upper limit (e.g., a first threshold) for the request cost of a single computing node. It will be understood that the request cost here may be, for example, a cost that the user 140 should pay (e.g., deducting a corresponding fee or credit value, etc.). In other words, if the request cost of a given second compute node among the plurality of second compute nodes in the computing system 110 meets (e.g., less than or equal to) the first threshold, the task manager 210 may request the given second compute node from the computing system 110. If the request cost of a given second compute node among the plurality of second computing nodes in the computing system 110 does not meet (e.g., exceed) the first threshold, the task manager 210 may suspend the request of the given second compute node from the computing system 110.

Generally speaking, the request cost of the given second computing node can vary. For example, when the workload of the computing system 110 is heavy, the request cost can be increased; and when the workload of the computing system 110 is light, the request cost can be reduced. With the example implementation of the present disclosure, the task manager 210 is allowed to dynamically adjust the allocation request 340 according to the pre-specified application policy 330, thereby improving the flexibility of task execution.

According to an example implementation of the present disclosure, the application policy 330 may further include a threshold upper limit (e.g., a second threshold) regarding the total cost of the applied second computing nodes. Specifically, if it is determined that the sum of the request cost of a set of second computing nodes and the request cost of a given second computing node meets (e.g., less than or equal to) the second threshold, the task manager 210 may request the given second computing node from the computing system 110. If it is determined that the sum of the request cost of a set of second computing nodes and the request cost of a given second computing node does not meet (e.g., greater than) the second threshold, the request for the given second computing node from the computing system 110 may be suspended. In this way, it can be ensured that the total cost of applying for the second computing nodes meets the expectations of the user 140, thereby avoiding the user 140 from falling into a state of excessive expenditure.

As details about the determination of the allocation request 340 have been described with reference to FIG. 3, the specific process of distribution and execution of tasks will be described below. According to an example implementation of the present disclosure, a plurality of tasks can be managed using the task queue 230. For example, various tasks can be added to the task queue 230 according to the receiving time of each task. Alternatively and/or additionally, priorities can be set for tasks, and tasks with different priorities can be managed in a plurality of queues. Alternatively and/or additionally, various tasks can be managed based on the execution time of each task. For example, tasks with shorter execution times can be prioritized for distribution, and so on.

The task manager 210 may distribute a target task (e.g., a task located at the head of the task queue 230) to a target second computing node in an idle state in a set of second computing nodes 220. During task execution, if the operating state of the target second computing node is normal and the target second computing node has not been recycled by the computing system 110, the target task can be executed smoothly. If the execution is completed, the target task can be removed from the task queue 230. It will be understood that during task execution, new tasks can be continuously received, and the received new tasks can be added to the tail of the task queue 230. In this way, the task manager 210 can execute each task in chronological order.

According to an example implementation of the present disclosure, since the available duration of the second computing node is unknown, the second computing node might be recycled at any time point. At this time, a task executed at the recycled second computing node will be interrupted, and the task manager 210 can reinsert the interrupted task into the task queue 230 to continue execution. For example, the interrupted task can be inserted into the head of the task queue 230 to prioritize distribution of the task; alternatively and/or additionally, the interrupted task can be inserted into other locations in the task queue 230.

According to an example implementation of the present disclosure, the task 150 may include a plurality of steps, and when the task 150 is interrupted, if the task 150 does not support continuing execution after interruption, the entire task needs to be re-executed from the beginning of task 150. In order to improve the success rate of task execution, the task 150 can be divided into a plurality of sub-tasks and set to support the mode of continuing execution after interruption. Specifically, whether to execute the continuation mode can be set based on the execution time of the task 150 and/or the number of steps included.

If the execution time is long and/or a large number of steps are included, the task 150 can be set to support the continuation mode. In this way, it can be ensured that in the event of a task interruption, not all tasks need to be re-executed, but execution may continue from the interruption point. If the execution time is short and/or a few steps are included, the task 150 can be set as not supporting the continuation mode. It will be understood that the continuation mode requires extra computing resources to provide additional support, which may involve extra computing resources and time overhead. When the task is small, even if the task execution process is interrupted and the interrupted task is re-executed, it will not cause excessive computing resources and time overhead.

Figure 4:
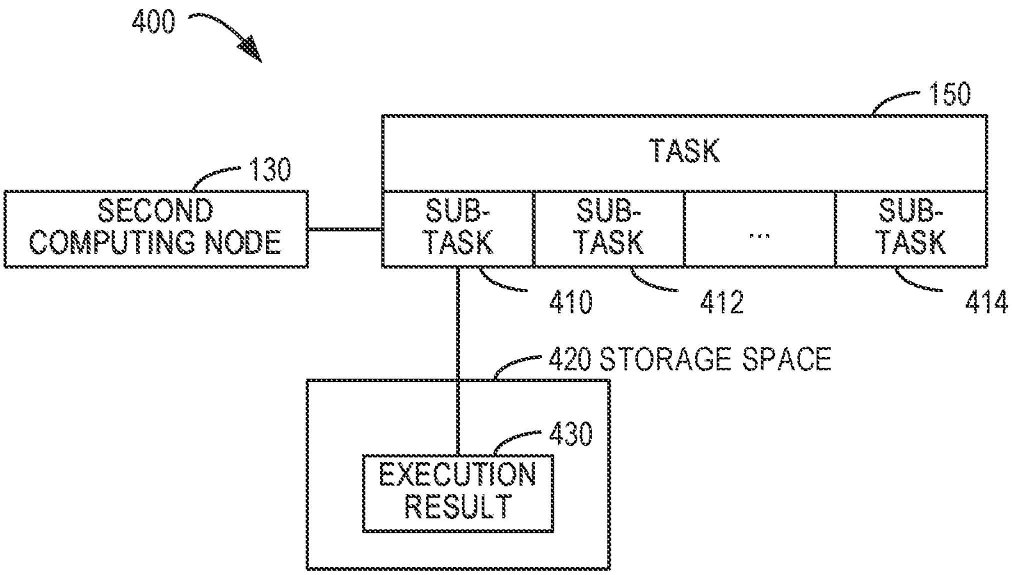
FIG. 4 shows a block diagram of a process of executing a task based on dividing the task into a plurality of sub-tasks according to some implementations of the present disclosure.

According to an example implementation of the present disclosure, the task manager 210 may divide a target task (e.g., task 150) in the task queue 230 into a plurality of sub-tasks. FIG. 4 shows a block diagram 400 of a process for executing a task based on dividing the task into a plurality of sub-tasks according to some implementations of the present disclosure. As shown in FIG. 4, the task 150 may be divided into a plurality of sub-tasks 410, 412, . . . , and 414. Assuming that the task 150 includes 10,000 steps, the task 150 may be divided into 10 sub-tasks according to a predetermined step size (e.g., 1000 steps or other numerical values). Alternatively and/or additionally, each sub-task may include the same or different numbers of steps.

According to an example implementation of the present disclosure, the task 150 can be divided into a plurality of sub-tasks according to predetermined execution time intervals. At this time, if the execution time of the task 150 is longer, more sub-tasks can be divided, and if the execution time of the task 150 is shorter, fewer sub-tasks can be divided.

Further, the task manager 210 may distribute the target sub-task in the plurality of sub-tasks to the target second computing node in the set of second computing nodes 220. For example, the sub-task 410 may be assigned to the second computing node 130, at which time the second computing node 130 will execute the various steps in the sub-task 410. If the sub-task 410 has already been executed (i.e., completed) at the second computing node 130, an execution result 430 of the sub-task 410 may be stored in a storage space 420 associated with the task 150. At this time, the execution result 430 may be stored in the storage space 420 as an intermediate result. It will be understood that the storage space 420 does not change with the state change of the second computing node 130. In other words, even if the second computing node 130 is recycled, the execution result 430 in the storage space 420 will remain valid.

If the second compute node 130 continues to be available (i.e., not recycled), the second compute node 130 can continue to process the next sub-task 412 after the sub-task 410. Where the sub-task 412 has been completed, the execution result of the sub-task 412 can be stored in the storage space 420 to overwrite the execution result 430 of the sub-task 410. Alternatively and/or additionally, the execution result of each sub-task can be retained during the task execution. In this way, the task execution history can be tracked and the execution result of the sub-task can be queried when needed.

According to an example implementation of the present disclosure, if the available duration of the second computing node 130 expires (i.e., is recycled), the sub-task 412 can be distributed to a further second computing node (e.g., the second computing node 222) in the set of second computing nodes 220. Subsequently, the task manager 210 can instruct the further second computing node to execute the sub-task 412 based on the execution result 430 in the storage space. With the example implementation of the present disclosure, it is not necessary to re-execute the entire task 150 from the beginning of the task 150, but execution can be continued from the position where the task is interrupted. In this way, the overhead of computing resources and time for re-executing the task 150 can be reduced, thereby improving the performance of task execution.

According to an example implementation of the present disclosure, the available duration of the allocated second computing node will affect the performance of executing sub-tasks and further affect the performance of executing tasks. The larger the available duration, the greater the amount of processing that can be completed, and the smaller the available duration, the smaller the amount of processing that can be completed. At this time, a specific way of dividing sub-tasks can be determined based on the operating history of a set of second computing nodes 220.

Figure 5:
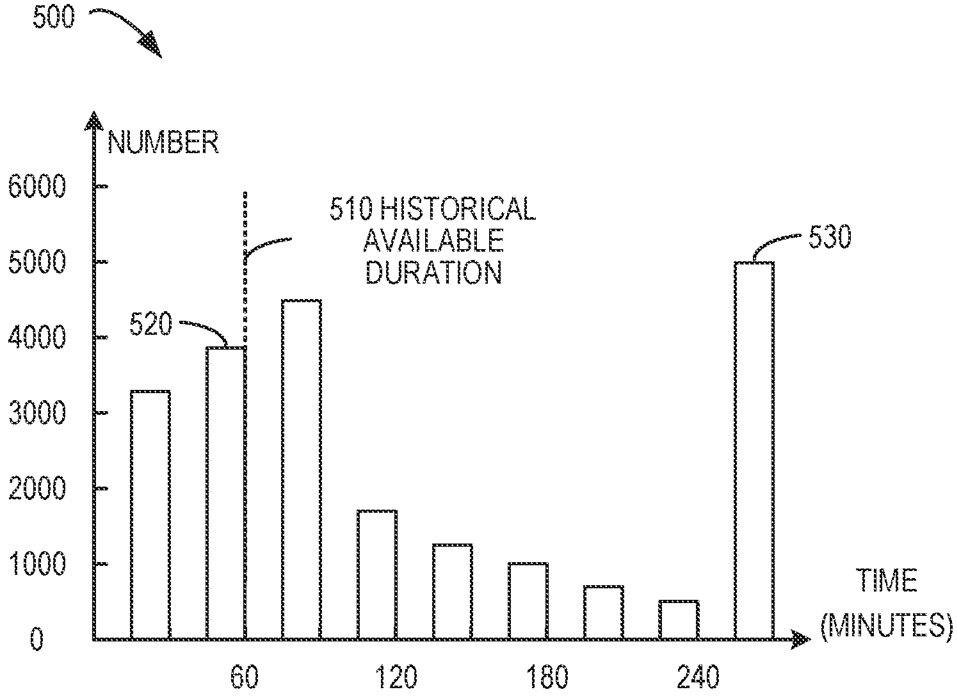
FIG. 5 shows a block diagram of the historical operating status of computing nodes according to some implementations of the present disclosure.

Specifically, the historical available duration of a set of second computing nodes can be obtained based on the operating history of the set of second computing nodes. It will be understood that the available duration of each second computing node can vary here, and the historical available duration determined here can be an estimated value representing the available duration of most second computing nodes. FIG. 5 shows a block diagram 500 of the historical operating status of computing nodes according to some implementations of the present disclosure. As shown in FIG. 5, the horizontal coordinate represents a period of time in the past, and the vertical coordinate represents the number of second computing nodes that have been recycled at various time points in the past. For example, a block 520 represents the number of second computing nodes recycled within the range of 50 minutes, and a block 530 shows the number of second computing nodes recycled after 200 minutes. As seen from FIG. 5, most of the second computing nodes are recycled within the range of 0 to 240 minutes, and a large number of computing nodes are recycled within 60-90 minutes, at which time, 60 minutes can be used as the historical available duration 510.

According to an example implementation of the present disclosure, the task 150 may be divided based on the historical available duration 510, so that the execution time of each resulting sub-task 410, 412, . . . , 414 is lower than the historical available duration. In this way, it can be ensured that the second computing node 130 can complete the allocated sub-task 410 with a high probability before being recycled. Hereinafter, more details of the dividing process are described with reference to FIG. 6, which shows a block diagram 600 of the process for dividing a task into multiple sub-tasks according to some implementations of the present disclosure.

Figure 6:
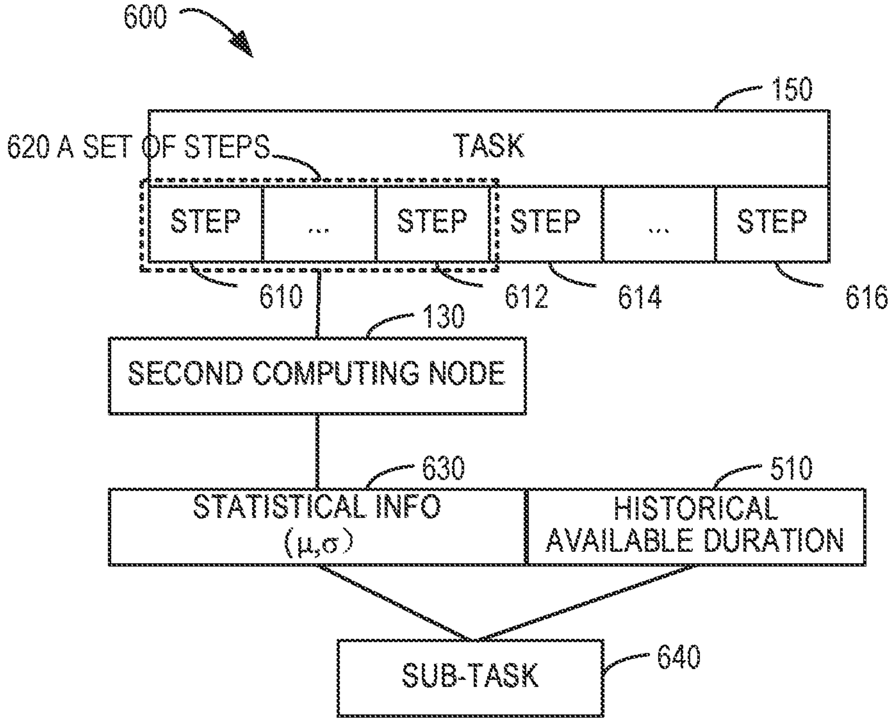
FIG. 6 shows a block diagram of a process of dividing a task into a plurality of sub-tasks according to some implementations of the present disclosure.

As shown in FIG. 6, the task 150 can include a plurality of steps 610, . . . , 612, 614, . . . , 616. A set of steps can be selected from the plurality of steps in the task 150. Assuming that the task 150 includes 10,000 steps, 1000 (or other number) steps can be selected. A set of steps 610 can be distributed to any computing node in a set of second computing nodes 220 (e.g., second computing node 130). The second computing node 130 can perform a set of steps 610. Assuming that the second computing node 130 is not recycled during execution, the second computing node 130 can complete all 1000 steps. Statistical information 630 (e.g., average duration μ and corresponding variance σ) for performing a single step can be determined based on statistical data for performing 1000 steps. Assuming that the execution duration of a single step follows a normal distribution, the number of steps that can be completed within the historical available duration 510 (e.g., 60 minutes=3600 seconds) under a predetermined probability (e.g., 97% or other numerical values) can be estimated based on a cumulative function of the normal distribution.

$$T_e = \left[\frac{3600}{1000*(\mu+2*\sigma)}\right] \qquad \text{Formula 3}$$

In Formula 3, $T_e$ denotes the number of steps that can be completed within the historical available duration 510 (e.g., 60 minutes=3600 seconds), μ denotes the average duration taken to perform a single step, and σ denotes the corresponding variance. According to an example implementation of the present disclosure, μ and σ determined based on historical data can be brought into Formula 3 to determine the number of steps that can be completed within the historical available duration 510.

It will be understood that Formula 3 shows an approximate calculation formula at a 97% probability, and $T_e$ can be approximately determined based on other formulas when different probabilities are selected. Further, the number of steps included in the sub-task 640 can be determined based on $T_e$. For example, when dividing the task 150, it can be specified that the number of steps in each sub-task does not exceed $T_e$. With the example implementation of the present disclosure, it can be ensured that in most cases, the elastic calculation node can complete the assigned sub-task with a high probability before being recycled. In this way, the completion rate of each sub-task can be increased, thereby improving the execution performance of the entire task.

It will be appreciated that the foregoing has only described a process of executing a task by using various compute nodes in a computing system. According to an example implementation of the present disclosure, the method described above may be periodically performed to process a plurality of tasks. For example, a task manager may receive new tasks and adjust the number of applied elastic compute nodes based on the demand for computing resources of tasks in the task queue.

The process of executing a plurality of tasks using stable computing nodes and elastic computing nodes in the computing system 110 has been described above. Hereinafter, specific steps for executing high-throughput tasks in the computing system 110 will be described using high-throughput tasks as specific examples. Here, high-throughput tasks refer to a collection of a plurality of independent tasks to be processed, and high-throughput tasks can be performed using the technical solutions described above.

According to an example implementation of the present disclosure, the computing system 110 can be a computing system provided in a cloud environment (e.g., a public cloud-based computing system), and the first computing node 120 can be a reserved instance in the public cloud, which allows users to purchase computing resources in units of "months" or "years". The second computing node 230 can be a bidding instance in the public cloud, which is usually inexpensive and allows users to use currently idle and available resources with unknown duration in the cloud to perform computation. With the example implementation of the present disclosure, users can call idle computing nodes in a more stable and reliable manner, thereby improving the throughput of high-throughput tasks.

Historical data of the computing system 110 can be collected, and the historical available duration of elastic computing nodes can be determined. Further, high-throughput tasks can be set to support continued execution mode based on the historical available duration and various information of high-throughput tasks. Specifically, each sub-task in high-throughput tasks can be determined based on Formula 3. For example, a high-throughput task can be divided into a plurality of sub-tasks.

The high-throughput task can be registered with the task queue 230. Specifically, the task can be registered at any time point in time, for example, before or after the task manager is started. In other words, the task queue 230 can dynamically receive tasks from the user 140. The task manager 210 can be started at a stable computing node (e.g., the first computing node 120). At this time, the task manager 210 can apply for new elastic computing nodes to the computing system 110 or reduce the allocated elastic computing nodes according to the request policy 330 based on the backlog of high-throughput tasks in the task queue 230 and the load of elastic computing nodes that have been applied for.

Furthermore, a stateless computing service can be started at the second computing node, which can start and manage a plurality of tasks in an independent timing sequence and provide an interface to return the number of tasks that the computing node can accommodate and the situation of current running tasks. The task manager can distribute registered tasks in the task queue 230 to the computing service based on the information returned by the computing service, and record the matching relationship between the tasks and the computing services in the elastic computing nodes. The computing service can process tasks, and where the task supports the continued execution mode, the computing service can store the corresponding execution result of each sub-task in a shared storage device.

According to an example implementation of the present disclosure, if the elastic computing node is recycled during task execution, the task manager 210 redistributes the task to the computing service of a further elastic compute node through the matching relationship. If the task supports the continued execution mode, the further elastic compute node can retrieve the execution result of the previous sub-task from the shared storage device and continue to execute the next sub-task until all tasks are completed. If all tasks are completed, the task manager 210 can mark the task as completed and remove the task from the task queue 230.

It will be appreciated that although the process of executing high-throughput tasks from a user by means of various computing nodes in the computing system 110 has been described above, there may be a plurality of similar users and the methods described above may be used to schedule various high-throughput tasks. At this time, the task manager 210 can manage a plurality of elastic computing nodes in parallel to execute a plurality of received tasks.

With the example implementation of the present disclosure, since the task manager 210 is located at a stable computing node with a known available duration, the task manager 210 can operate continuously in a stable and reliable manner within the available duration of the stable computing node. Furthermore, although the available duration of the elastic computing node is unknown, the task manager 210 can continuously monitor the status of each elastic computing node and redistribute interrupted tasks to other elastic computing nodes after a certain elastic computing node is recycled. In this way, the available resources of a large number of elastic computing nodes in the computing system can be fully utilized, thereby improving the performance of task processing.

Example Process

Figure 7:
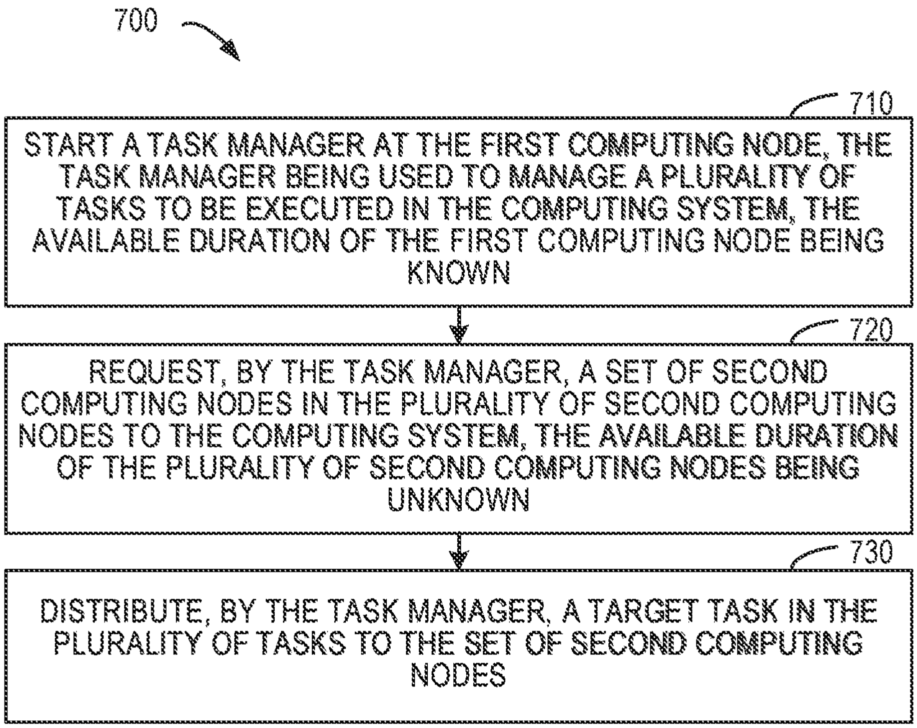
FIG. 7 shows a flowchart of a method of executing tasks in a computing system according to some implementations of the present disclosure.

FIG. 7 shows a flowchart of a method 700 for generating positive sample pairs for a contrastive learning model in accordance with some embodiments of the present disclosure. The computing system comprises a first computing node and a plurality of second computing nodes, available duration of the first computing node is known, and available duration of the plurality of second computing nodes is unknown. At a block 710, a task manager is started at the first computing node, the task manager being used to manage a plurality of tasks to be executed in the computing system. At a block 720, a set of second computing nodes in the plurality of second computing nodes are requested by the task manager to the computing system. At a block 730, a target task in the plurality of tasks is distributed by the task manager to the set of second computing nodes so as to execute the target task by using the set of second computing nodes.

According to an example implementation of the present disclosure, requesting, by the task manager, the set of second computing nodes comprises: requesting the set of second computing nodes to the computing system based on a computing resource demand for executing the plurality of tasks.

According to an example implementation of the present disclosure, requesting, by the task manager, the set of second computing nodes comprises: in response to determining that the number of second computing nodes waiting to be allocated by the computing system is lower than a predetermined threshold, requesting, by the task manager, the set of second computing nodes to the computing system.

According to an example implementation of the present disclosure, requesting the set of second computing nodes to the computing system comprises: in response to determining that a request cost of a given second computing node in the plurality of second computing nodes meets a first threshold, requesting the given second computing node to the computing system.

According to an example implementation of the present disclosure, requesting the set of second computing nodes to the computing system comprises: in response to determining that a sum of a request cost of the set of second computing nodes and the request cost of the given second computing node meets a second threshold, requesting the given second computing node to the computing system.

According to an example implementation of the present disclosure, distributing, by the task manager, the target task comprises: dividing the target task into a plurality of sub-tasks; and distributing a target sub-task in the plurality of sub-tasks to a target second computing node in the set of second computing nodes.

According to an example implementation of the present disclosure, the method further comprises: in response to determining that the target sub-task is executed at the target second computing node, storing an execution result of the target sub-task to a storage space associated with the target task.

According to an example implementation of the present disclosure, the method further comprises: in response to determining that the available duration of the target second computing node expires, distributing a next sub-task after the target sub-task in the plurality of sub-tasks to a further second computing node in the set of second computing nodes; and instructing the further second computing node to execute the next sub-task based on the execution result in the storage space.

According to an example implementation of the present disclosure, the dividing the target task into the plurality of sub-tasks comprises: obtaining the historical available duration of the set of second computing nodes based on an operational history of the set of second computing nodes; and dividing the target task into the plurality of sub-tasks based on the historical available duration, an execution time of a sub-task in the plurality of sub-tasks being less than the historical available duration.

According to an example implementation of the present disclosure, the method dividing the target task into the plurality of sub-tasks based on the historical available duration comprises: selecting a set of steps from a plurality of steps of the target task; performing the set of steps by a second computing node in the set of second computing nodes so as to determine the statistical duration for performing a single step in the set of steps; and dividing the target task into the plurality of sub-tasks based on the historical available duration and the statistical duration.

Example Apparatus and Equipment

Figure 8:
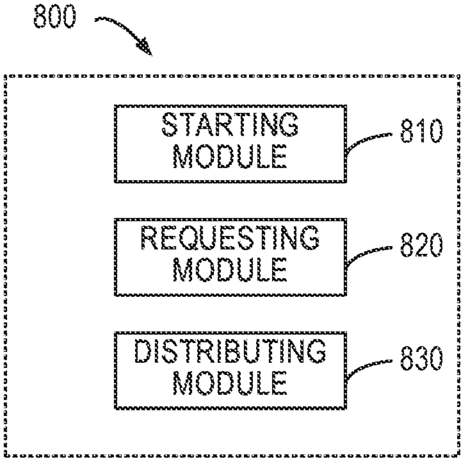
FIG. 8 shows a block diagram of an apparatus for executing tasks in a computing system according to some implementations of the present disclosure.

FIG. 8 shows a block diagram of an apparatus 800 for generating positive sample pairs for a contrastive learning model in accordance with some embodiments of the present disclosure. The computing system comprises a first computing node and a plurality of second computing nodes, available duration of the first computing node is known, and available duration of the plurality of second computing nodes is unknown. The apparatus 800 comprises: a starting module 810, configured for starting a task manager at the first computing node, the task manager being used to manage a plurality of tasks to be executed in the computing system; a requesting module 820, configured for requesting, by the task manager, a set of second computing nodes in the plurality of second computing nodes to the computing system; and a distributing module 830, configured for distributing, by the task manager, a target task in the plurality of tasks to the set of second computing nodes so as to execute the target task by using the set of second computing nodes.

According to an example implementation of the present disclosure, the requesting module comprises: a demand-based requesting module, configured for requesting the set of second computing nodes to the computing system based on a computing resource demand for executing the plurality of tasks.

According to an example implementation of the present disclosure, the requesting module comprises: a wait-based requesting module, configured for in response to determining that the number of second computing nodes waiting to be allocated by the computing system is lower than a predetermined threshold, requesting, by the task manager, the set of second computing nodes to the computing system.

According to an example implementation of the present disclosure, the requesting module comprises: a cost-based requesting module, configured for in response to determining that a request cost of a given second computing node in the plurality of second computing nodes meets a first threshold, requesting the given second computing node to the computing system.

According to an example implementation of the present disclosure, the requesting module comprises: a total-cost-based requesting module, configured for in response to determining that a sum of a request cost of the set of second computing nodes and the request cost of the given second computing node meets a second threshold, requesting the given second computing node to the computing system.

According to an example implementation of the present disclosure, the distributing module comprises: a dividing module, configured for dividing the target task into a plurality of sub-tasks; and a sub-task module, configured for distributing a target sub-task in the plurality of sub-tasks to a target second computing node in the set of second computing nodes.

According to an example implementation of the present disclosure, the apparatus further comprises: a storing module, configured for in response to determining that the target sub-task is executed at the target second computing node, storing an execution result of the target sub-task to a storage space associated with the target task.

According to an example implementation of the present disclosure, the apparatus further comprises: a re-distributing module, configured for, in response to determining that the available duration of the target second computing node expires, distributing a next sub-task after the target sub-task in the plurality of sub-tasks to a further second computing node in the set of second computing nodes; and an instructing module, configured for instructing the further second computing node to execute the next sub-task based on the execution result in the storage space.

According to an example implementation of the present disclosure, the dividing module comprises: an obtaining module, configured for obtaining the historical available duration of the set of second computing nodes based on an operational history of the set of second computing nodes;

and a history-based dividing module, configured for dividing the target task into the plurality of sub-tasks based on the historical available duration, an execution time of a sub-task in the plurality of sub-tasks being less than the historical available duration.

According to an example implementation of the present disclosure, the history-based dividing module comprises: a selecting module, configured for selecting a set of steps from a plurality of steps of the target task; a statistic module, configured for performing the set of steps by a second computing node in the set of second computing nodes so as to determine the statistical duration for performing a single step in the set of steps; and a statistic-based dividing module, configured for dividing the target task into the plurality of sub-tasks based on the historical available duration and the statistical duration.

Figure 9:
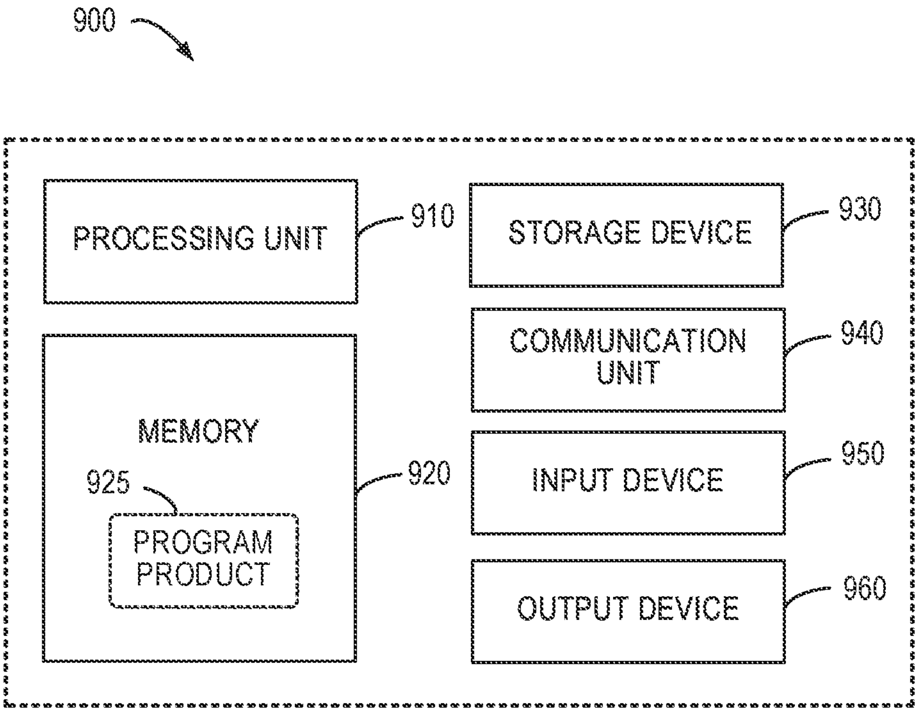
FIG. 9 shows a block diagram of a device in which a plurality of implementations of the present disclosure can be implemented.

FIG. 9 shows an electronic device 900 in which one or more implementations of the present disclosure may be implemented. It would be understood that the electronic device 900 shown in FIG. 9 is only an example and should not constitute any restriction on the function and scope of the implementations described herein.

As shown in FIG. 9, the electronic device 900 is in the form of a general computing device. The components of the electronic device 900 may comprise but are not limited to, one or more processors or processing units 910, a memory 920, a storage device 930, one or more communication units 940, one or more input devices 950, and one or more output devices 960. The processing unit 910 may be an actual or virtual processor and can execute various processes according to the programs stored in the memory 920. In a multiprocessor system, a plurality of processing units execute computer executable instructions in parallel to improve the parallel processing capability of the electronic device 900.

The electronic device 900 typically comprises a variety of computer storage medium. Such medium may be any available medium that is accessible to the electronic device 900, comprising but not limited to volatile and non-volatile medium, removable, and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 930 may be any removable or non-removable medium and may comprise a machine-readable medium, such as a flash drive, a disk, or any other medium, which can be used to store information and/or data (such as training data for training) and can be accessed within the electronic device 900.

The electronic device 900 may further comprise additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk can be provided. In these cases, respective driver may be connected to the bus (not shown) by one or more data medium interfaces. The memory 920 may comprise a computer program product 925, which has one or more program modules configured to perform various methods or acts of various implementations of the present disclosure.

The communication unit 940 communicates with a further computing device through the communication medium. In addition, functions of components in the electronic device 900 may be implemented by a single computing cluster or a plurality of computing machines, which can communicate through a communication connection. Therefore, the electronic device 900 may be operated in a networking environment with a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The electronic device 900 may also communicate with one or more external devices (not shown) through the communication unit 940 as required. The external device, such as a storage device, a display device, etc., communicates with one or more devices that enable users to interact with the electronic device 900, or communicate with any device (for example, a network card, a modem, etc.) that makes the electronic device 900 communicate with one or more other computing devices. Such communication may be executed via an input/output (I/O) interface (not shown).

According to the example implementation of the present disclosure, a computer-readable storage medium is provided, on which a computer-executable instruction or computer program is stored, wherein the computer-executable instructions or the computer program is executed by the processor to implement the method described above. According to the example implementation of the present disclosure, a computer program product is also provided. The computer program product is physically stored on a non-transient computer-readable medium and comprises computer-executable instructions, which are executed by the processor to implement the method described above. According to the example implementation of the present disclosure, a computer program product is provided, on which computer program is stored and the program implements the method described above when executed by a processor.

Various aspects of the present disclosure are described herein with reference to the flow chart and/or the block diagram of the method, the device, the equipment, and the computer program product implemented according to the present disclosure. It would be understood that respective block of the flowchart and/or the block diagram and the combination of respective blocks in the flowchart and/or the block diagram may be implemented by computer-readable program instructions.

These computer-readable program instructions may be provided to the processing units of general-purpose computers, special computers, or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device, and/or other devices to work in a specific way. Therefore, the computer-readable medium containing the instructions comprises a product, which comprises instructions to implement various aspects of the functions/acts specified in one or more blocks in the flowchart and/or the block diagram.

The computer-readable program instructions may be loaded onto a computer, other programmable data processing apparatus, or other devices, so that a segment of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions, and operations of the system, the method, and the computer program product implemented according to the present disclosure. In this regard, respective block in the flowchart or the block diagram may represent a part of a module, a program segment, or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that respective block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Respective implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application, or improvement of technology in the market of respective implementation, or to enable other ordinary skills in the art to understand the various implementations disclosed herein.

We claim:

1. A method of executing tasks in a computing system, the computing system comprising a first computing node and a plurality of second computing nodes, available duration of the first computing node being known, available duration of the plurality of second computing nodes being unknown, and the method comprising:

starting a task manager at the first computing node, the task manager being used to manage a plurality of tasks to be executed in the computing system;

requesting, by the task manager, a set of second computing nodes in the plurality of second computing nodes to the computing system; and distributing, by the task manager, a target task in the plurality of tasks to the set of second computing nodes so as to execute the target task by using the set of second computing nodes.

2. The method of claim 1, wherein requesting, by the task manager, the set of second computing nodes comprises: requesting the set of second computing nodes to the computing system based on a computing resource demand for executing the plurality of tasks.

3. The method of claim 1, wherein requesting, by the task manager, the set of second computing nodes comprises: in response to determining that the number of second computing nodes waiting to be allocated by the computing system is lower than a predetermined threshold, requesting, by the task manager, the set of second computing nodes to the computing system.

4. The method of claim 1, wherein requesting the set of second computing nodes to the computing system comprises: in response to determining that a request cost of a given second computing node in the plurality of second computing nodes meets a first threshold, requesting the given second computing node to the computing system.

5. The method of claim 4, wherein requesting the set of second computing nodes to the computing system comprises: in response to determining that a sum of a request cost of the set of second computing nodes and the request cost of the given second computing node meets a second threshold, requesting the given second computing node to the computing system.

6. The method of claim 1, wherein distributing, by the task manager, the target task comprises:

dividing the target task into a plurality of sub-tasks; and distributing a target sub-task in the plurality of sub-tasks to a target second computing node in the set of second computing nodes.

7. The method of claim 6, further comprising: in response to determining that the target sub-task is executed at the target second computing node, storing an execution result of the target sub-task to a storage space associated with the target task.

8. The method of claim 7, further comprising:

in response to determining that the available duration of the target second computing node expires, distributing a next sub-task after the target sub-task in the plurality of sub-tasks to a further second computing node in the set of second computing nodes; and instructing the further second computing node to execute the next sub-task based on the execution result in the storage space.

9. The method of claim 6, wherein dividing the target task into the plurality of sub-tasks comprises:

obtaining the historical available duration of the set of second computing nodes based on an operational history of the set of second computing nodes; and dividing the target task into the plurality of sub-tasks based on the historical available duration, an execution time of a sub-task in the plurality of sub-tasks being less than the historical available duration.

10. The method of claim 9, wherein dividing the target task into the plurality of sub-tasks based on the historical available duration comprises:

selecting a set of steps from a plurality of steps of the target task;

performing the set of steps by a second computing node in the set of second computing nodes so as to determine the statistical duration for performing a single step in the set of steps; and dividing the target task into the plurality of sub-tasks based on the historical available duration and the statistical duration.

11. An electronic device, comprising:

at least one processing unit; and at least one memory coupled to the at least one processing unit and storing instructions to be executed by the at least one processing unit, the instructions, when executed by the at least one processing unit, causing the electronic device to perform a method of executing tasks in a computing system, the computing system comprising a first computing node and a plurality of second computing nodes, available duration of the first computing node being known, available duration of the plurality of second computing nodes being unknown, and the method comprising:

starting a task manager at the first computing node, the task manager being used to manage a plurality of tasks to be executed in the computing system;

requesting, by the task manager, a set of second computing nodes in the plurality of second computing nodes to the computing system; and distributing, by the task manager, a target task in the plurality of tasks to the set of second computing nodes so as to execute the target task by using the set of second computing nodes.

12. The device of claim 11, wherein requesting, by the task manager, the set of second computing nodes comprises: requesting the set of second computing nodes to the computing system based on a computing resource demand for executing the plurality of tasks.

13. The device of claim 11, wherein requesting, by the task manager, the set of second computing nodes comprises: in response to determining that the number of second computing nodes waiting to be allocated by the computing system is lower than a predetermined threshold, requesting, by the task manager, the set of second computing nodes to the computing system.

14. The device of claim 11, wherein requesting the set of second computing nodes to the computing system comprises: in response to determining that a request cost of a given second computing node in the plurality of second computing nodes meets a first threshold, requesting the given second computing node to the computing system.

15. The device of claim 14, wherein requesting the set of second computing nodes to the computing system comprises: in response to determining that a sum of a request cost of the set of second computing nodes and the request cost of the given second computing node meets a second threshold, requesting the given second computing node to the computing system.

16. The device of claim 11, wherein distributing, by the task manager, the target task comprises:

dividing the target task into a plurality of sub-tasks; and distributing a target sub-task in the plurality of sub-tasks to a target second computing node in the set of second computing nodes.

17. The device of claim 16, further comprising: in response to determining that the target sub-task is executed at the target second computing node, storing an execution result of the target sub-task to a storage space associated with the target task.

18. The device of claim 17, further comprising:

in response to determining that the available duration of the target second computing node expires, distributing a next sub-task after the target sub-task in the plurality of sub-tasks to a further second computing node in the set of second computing nodes; and instructing the further second computing node to execute the next sub-task based on the execution result in the storage space.

19. The device of claim 16, wherein dividing the target task into the plurality of sub-tasks comprises:

obtaining the historical available duration of the set of second computing nodes based on an operational history of the set of second computing nodes; and dividing the target task into the plurality of sub-tasks based on the historical available duration, an execution time of a sub-task in the plurality of sub-tasks being less than the historical available duration.

20. A non-transitory computer-readable storage medium, on which a computer program is stored, the computer program, when executed by a processor, causing the processor to perform a method of executing tasks in a computing system, the computing system comprising a first computing node and a plurality of second computing nodes, available duration of the first computing node being known, available duration of the plurality of second computing nodes being unknown, and the method comprising:

starting a task manager at the first computing node, the task manager being used to manage a plurality of tasks to be executed in the computing system;

requesting, by the task manager, a set of second computing nodes in the plurality of second computing nodes to the computing system; and distributing, by the task manager, a target task in the plurality of tasks to the set of second computing nodes so as to execute the target task by using the set of second computing nodes.

* * * * *